March 14, 1961  H. T. STEVINSON ET AL  2,974,898
QUICK RELEASE MECHANISM
Filed Aug. 12, 1957  5 Sheets-Sheet 3
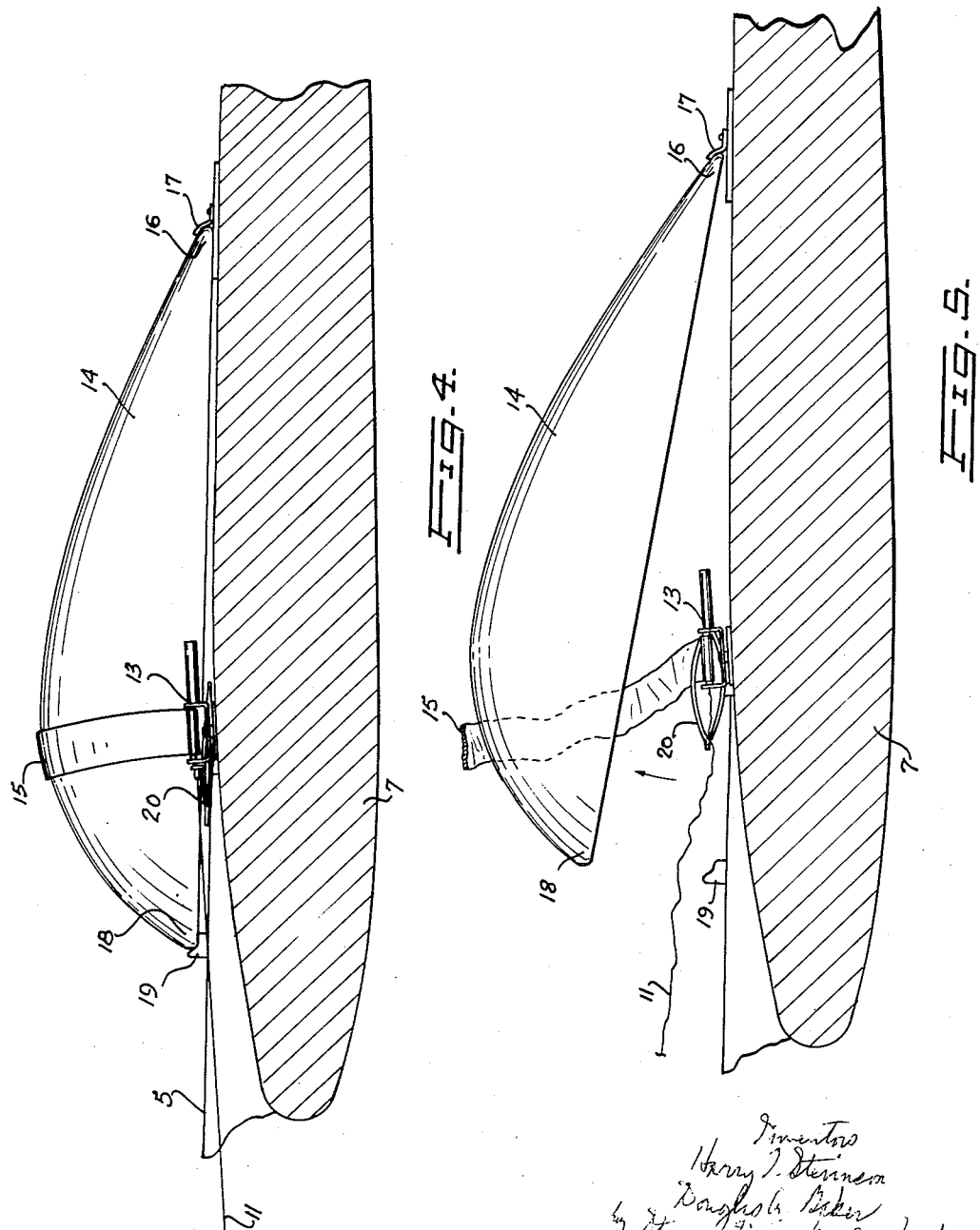

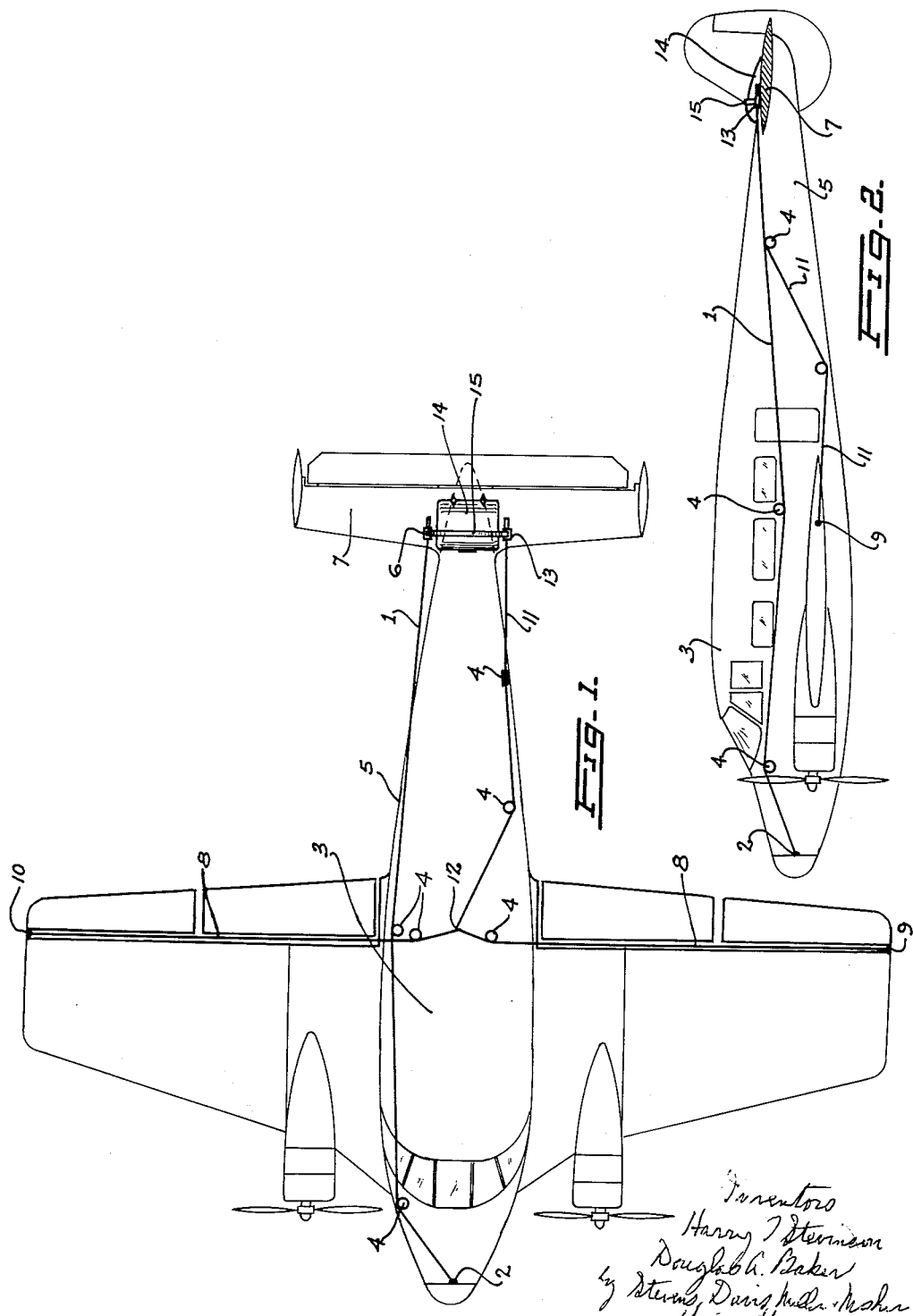

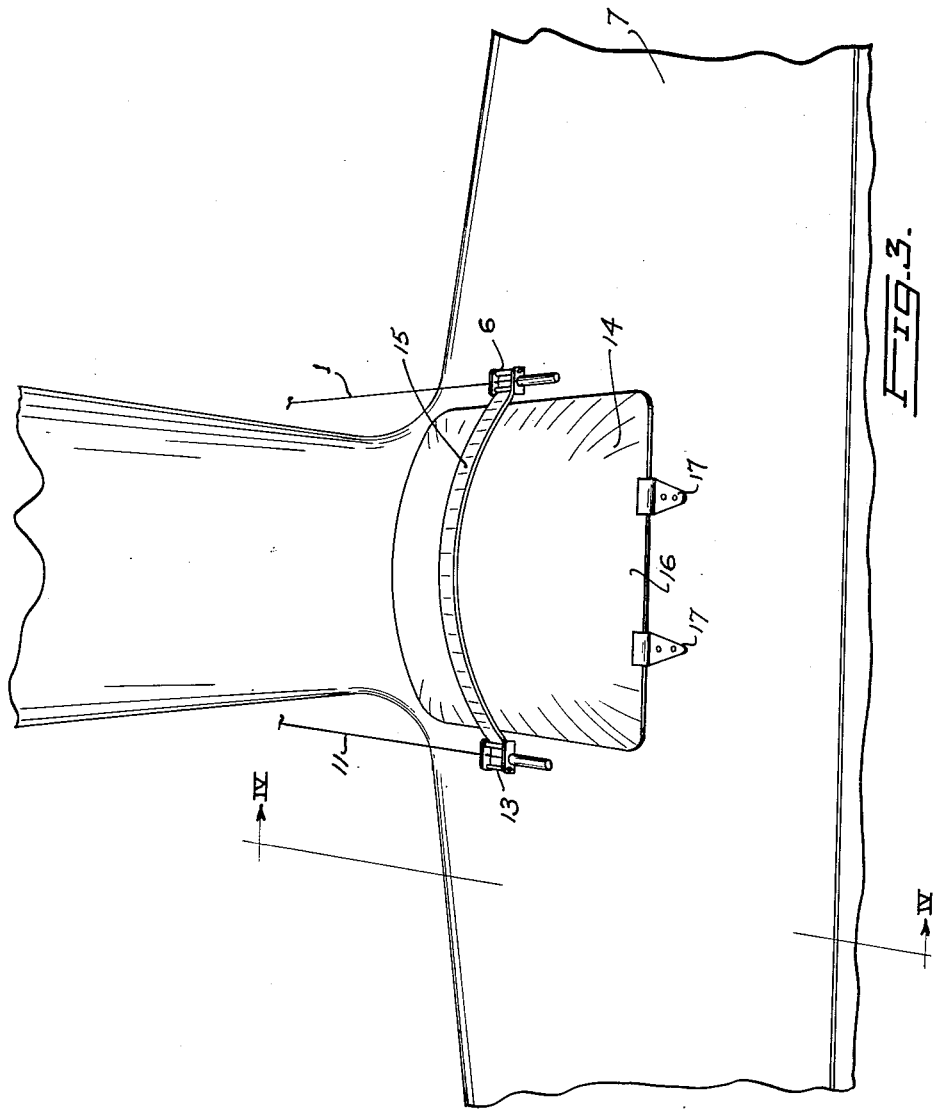

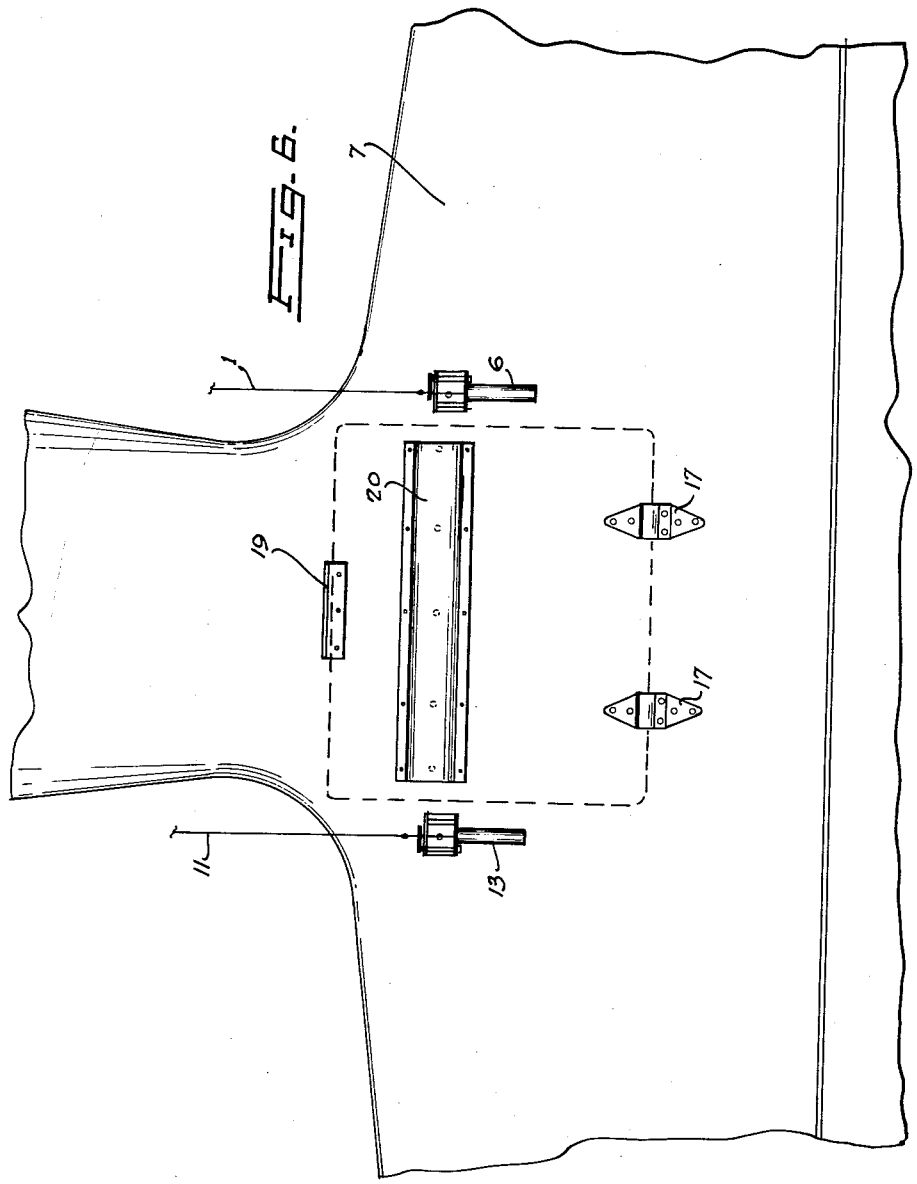

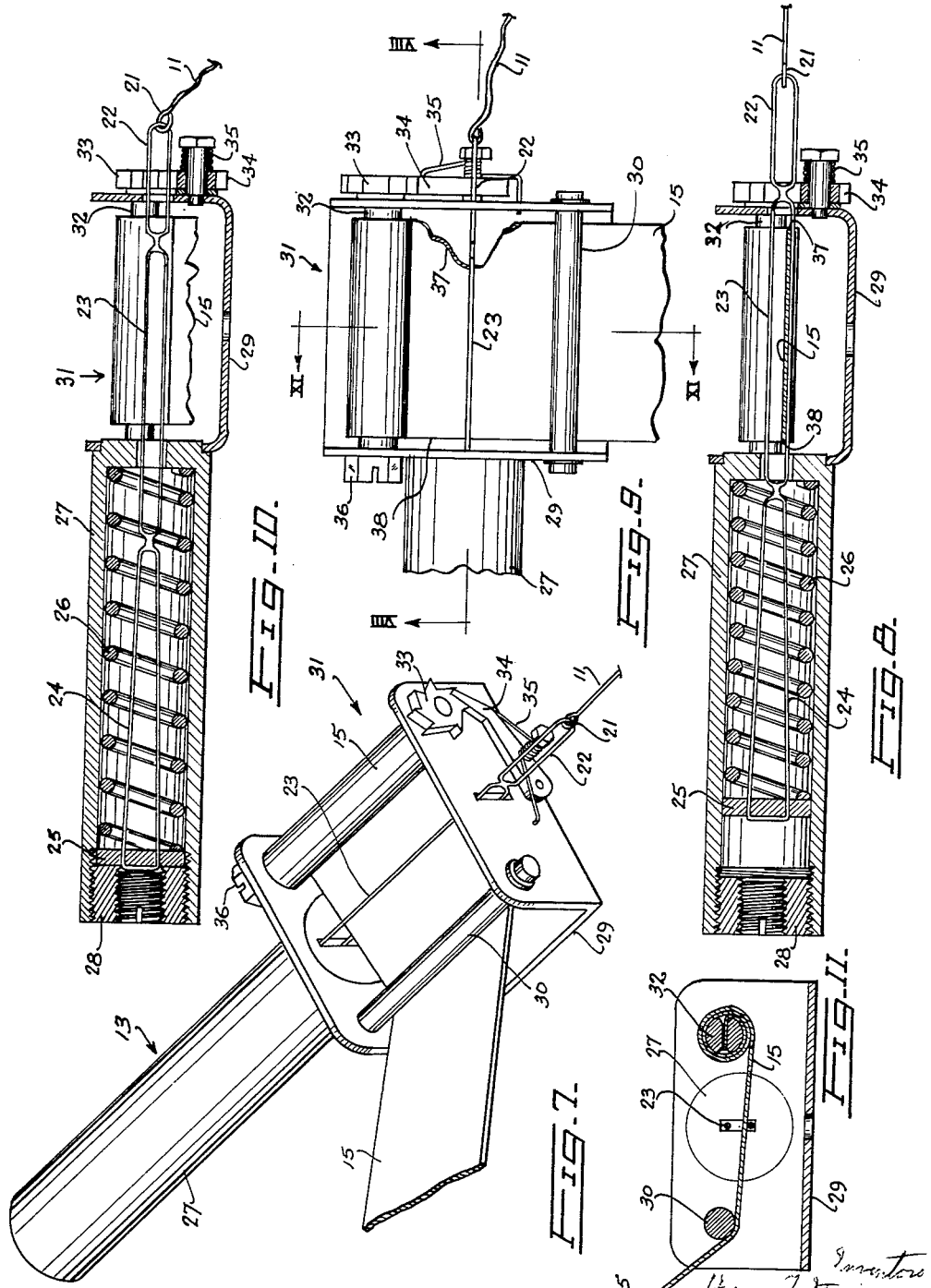

United States Patent Office 2,974,898
Patented Mar. 14, 1961

2,974,898
QUICK RELEASE MECHANISM

Harry T. Stevinson and Douglas A. Baker, Ottawa, Ontario, Canada, assignors to National Research Council, Ottawa, Ontario, Canada, a body corporate of Canada Filed Aug. 12, 1957, Ser. No. 677,580

5 Claims. (Cl. 244—1)

This invention relates to a quick acting release mechanism which is particularly adapted for the release of loads and devices in instances where virtually instantaneous release is required.

The mechanism has been developed for use with a crash position indicator for aircraft of the type disclosed in U.S. application No. 648,680 of Harry T. Stevinson, filed March 26, 1957, although, as will be apparent from the description that follows, the mechanism as such, is clearly applicable in other circumstances where a body is to be released from a parent structure with a minimum of delay, and particularly under circumstances where the release is to be automatic and consequent upon failure of rigidity of the parent structure.

In the example which follows as illustration of the invention, it has been shown in use in conjunction with one of the types of crash position indicator described in said other application. This example is illustrated in the accompanying drawings, in which:

Fig. 1 is a plan view of an aircraft showing a crash position indicator and release mechanism mounted thereon.

Fig. 2 is a side elevation of the aircraft of Figure 1 showing the crash position indicator and the position of the release wires of the release mechanism.

Fig. 3 is an enlarged rear perspective view of the tailplane of the aircraft of Figs. 1 and 2 with the crash position indicator thereon.

Fig. 4 is a section on the line IV—IV in Figure 3.

Fig. 5 is the same as Figure 4 but a very short time after release of the crash position indicator.

Fig. 6 is a plan view of the tailplane seen in Figure 3 with the crash position indicator removed showing the various components of the release mechanism.

Fig. 7 is an overall perspective view of a release device that forms part of the crash position indicator release mechanism shown in the foregoing drawings.

Fig. 8 is a central longitudinal sectional elevation of the device of Figure 7 taken on the line VIII—VIII in Figure 9.

Fig. 9 is a plan view of the release device in the act of release.

Fig. 10 is a sectional elevation similar to Fig. 8 after release of the device.

Fig. 11 is a sectional elevation on XI—XI of Figure 9.

As is fully explained in the previous application referred to above, it is proposed to provide aircraft with a so-called crash position indicator device which, on crashing or aerial break-up of the aircraft, will transmit a radio signal to indicate to searching aircraft the position of the wreck. A vital requirement for such a device is extremely quick detachment from the aircraft. In some circumstances, it may be possible for the pilot or some other occupant of the aircraft to release the device before the actual moment of impact. On the other hand, this may often be impossible, and it is therefore a feature of the device disclosed in said earlier application that it should be adapted for release by conditions set up by the impact itself, the device being of such a nature and being so mounted on the aircraft that it will travel rapidly away from the aircraft once released and, unless conditions are especially unfavourable, become sufficiently separated from the aircraft to be undamaged by fire, explosion, or flying wreckage. It will be evident that for such travel of a separable device to have maximum effectiveness, the time delay between initial actuation of the release mechanism and actual release of the device must be extremely short, preferably of the order of a few milliseconds, since the forward speed of the aircraft may be assumed to be as high as 1,000 miles per hour at the moment of impact.

Referring to Figure 1, a wire 1 fixed to a point 2 near the nose of the aeroplane 3 extends over guides 4 shown generally as simple pulleys (alternatively guides in the form of eyes can be used) along the fuselage 5 to a release device 6 mounted on the tailplane 7. Another wire 8 stretches over guides 4 from wing tip to wing tip of the aeroplane 3 within the wing, fixed at the points 9 and 10. A third wire 11 is fastened to a point 12 of the wire 8 and extends back along the fuselage 5 to a second release device 13. The wires 1, 8 and 11 may extend inside or outside the aircraft, or partly inside and partly outside, at the discretion of the installation engineers. Alternative to the locations shown, one wire may extend along the top of the roof and over a windshield pillar to minimise obstruction of visibility. Winches may be provided at points 2, 9 and 10 for tensioning the wires.

As shown in Figs. 3 and 4 a crash position indicator 14 similar to that described in said other application is held in position on the tailplane 7 by a thin steel band 15, whose ends are passed through the release devices 6 and 13, and by sockets 17 fastened on the tailplane 7 which engage the trailing edge 16 of the crash position indicator. The leading edge 18 of the crash position indicator 14 rests on a platform 19 fastened to the fuselage 5. A long elliptical spring 20 is compressed beneath the crash position indicator 14 by the thin steel band 15. In the embodiment illustrated the spring 20 is shown attached to the aircraft, but, alternatively, it may be secured to the crash position indicator 14 itself, or may be free to fall away after operation. Figure 6 shows the fixed parts of this assembly with the crash position indicator not in position.

Referring to Figures 7 to 11 which are all views of the release device 13, an eye 21 of the wire 11 passes through an elongated loop 22 of wire. The loop 22 is connected to a second loop 23 which is connected at its other end to a third loop 24. The loop 24 passes around a plunger 25 which serves to contain a spring 26 within a barrel portion 27 of the device 13. A plug 28 is screwed into the barrel 27.

A member 29 of sheet metal in the form of a shallow U is mounted on the end of the barrel 27. An idler roller 30 and a winch 31 are carried by the upright sides of the member 29. The winch 31 consists of a slotted bolt 32 having mounted on one end a ratchet wheel 33 associated with a pawl 34 urged by a spring 35. At its other end the bolt 32 is formed with a slotted head 36.

The release devices 6 and 13 are mirror images of each other and the operation of either will release the crash position indicator 14. The operation of the quick release mechanism will be described with reference to the device 13.

In the normal operating condition the release device 13 is in the position shown in Figures 7 and 8 with the spring 26 compressed. The steel band 15 is passed under the roller 30, through the loop 23 and around the bolt 32 of the winch 31. The other end of the steel band 15 is placed over the crash position indicator 14 and similarly fastened to the other release device 6. The band 15 is tightened by turning a screwdriver in one or both of the slotted heads 36 forcing the crash position indicator 14 into its position compressing the elliptical spring 20 (Figs. 1 to 4). The loop 23 is longer than the width of the steel band 15 so that the wire 11 is permitted a measure of longitudinal movement without the ends of the loop 23 coming into contact with the steel band 15. This freedom of movement is necessary to allow for thermal expansion and contraction of the wire 11, screep due to fatigue of the metal of the wire 11 and the spring 26. The spring 26 is a stiff spring and is considerably compressed so that the wire 11 is highly stressed in tension.

The release device 13 will operate either if the tension in the wire 11 is considerably increased or decreased. If the tension in the wire 11 is released the stiff spring 26 extends very rapidly, since the inertia of loops 22, 23, 24 and the wire 11 is low. As the spring 26 extends the loop 23 cuts into the edge 37 of the thin steel band 15, as shown in Figure 9. Since this band 15 is highly stressed in tension it will immediately split across its full width, releasing the crash position indicator 14, as demonstrated in Figure 5. The crash position indicator 14 is then forced away from the tailplane 7 by the elliptical spring 20 and the aerodynamic forces acting on it, and the release device will take up the Figure 10 position.

It can be seen that increase in tension will also release the crash position indicator either by loop 23 cutting into the other edge 38 of the band 15, or by breakage of the wire 11 with consequent release of such tension and operation as just described.

Release of the tension in the wires 1 and 11 occurs automatically on impact or aerial break-up of the aeroplane 3, as soon as the aircraft frame loses its rigidity. Increase of tension in the wires 1 and 11 can be induced by a mid-air collision or manually should the wires be accessible. The wire 1 could be attached to the cockpit canopy or ejection seat; operation of the quick release mechanism being produced automatically by the pilot's escape from the aircraft.

It is to be understood that the present example of the release of a crash position indicator is provided as an example of the invention and that the latter is not restricted to the release of crash position indicators. The mechanism is appropriate to the severing of any taut holding down strip, band, or wire, when extremely rapid operation is required, and in locations in which the structure of the member carrying the device to be released is elongated and it is required that the mechanism be adapted for operation from a remote position.

The principal factors determining the speed of operation that can be achieved are the tension that can be maintained in the wire, and the inertia of the moving parts, i.e. the coils of the spring and the wire itself. The greater the tension and the lower the inertia, the shorter will be the operating time. To permit a very high tension to be employed, a very strong thin steel wire able to withstand stresses of the order of hundreds of thousands of pounds per square inch is employed. The preferred form of wire is stainless steel. It is anticipated that operating speeds of the order of a few milliseconds can be achieved.

Thus, in summary, the combination provided in the present invention is an aircraft, or other parent structure having two relatively fixed, spaced apart portions, namely one of the points 2, 9 or 10 near the nose or a wing extremity of the aircraft and the base 29 of the release device 6 mounted on the tailplane 7 of such aircraft; a body in the form of the crash position indicator 14 separable from the aircraft; a crash position indicator retaining member comprising a thin steel band 15 mounted on the aircraft; means for maintaining the steel band 15 in tension to hold the indicator in fixed relationship to the aircraft, such means comprising at least one of the two releasing devices 6 or 13 and particularly the rollers 30 and the winch 31; and an extensible crash position indicator releasing system, this system including an elongated member in the form of the wire 1, resilient means comprising a spring 26 connected to the wire 1, cutting means comprising a loop of wire 23, a portion of the perimeter of which defines a cutting edge, said loop of wire being acted upon by the spring 26 and movable between an inoperative and a cutting position, the spring 26 urging the loop of wire 23 to its cutting position. The inoperative position is such that the loop of wire 23 is out of cutting engagement with the steel band 15 and the cutting position is such that the loop of wire 23 is at least momentarily in cutting engagement with the steel band 15. The system also has fixing means securing one end of the system to the point 2 (or point 9 or 10) and the other end of the system to the base 29 of the release device 6 for normally maintaining the system highly stressed to hold the loop of wire 23 in its inoperative position against the action of the spring 26.

We claim:

1. A release device comprising a baseplate, a spring arranged to bear with one end against said baseplate, a member slidably mounted in said baseplate and acted upon by the other end of said spring so as to be movable between a stressed and a released position, a loop of wire movable with said sliding member, a portion of the perimeter of said loop defining a cutting edge, means for attaching a tension wire to said slidable member whereby to stress said spring, and means for positioning a retaining member to extend through said loop with said retaining member out of cutting engagement with said cutting edge in said stressed position and engaged by said cutting edge in said released position.

2. In combination; a parent structure having two spaced apart portions fixed in relation to each other; a body separable from said parent structure; a body retaining member mounted on said parent structure; means for maintaining said retaining member in tension to hold said body in fixed relationship to said parent structure; an elongated member having two ends, elongated resilient means having two ends, a first end of said resilient means being connected to a first end of said member, cutting means for cutting said retaining member, said cutting means being operatively associated with and acted upon by said resilient means and movable between an inoperative and a cutting position, said resilient means urging said cutting means to said cutting position, said inoperative position being such that said cutting means is out of cutting engagement with said retaining member and said cutting position being such that said cutting means is at least momentarily in cutting engagement with said retaining member, and means including fixing means securing the second ends of said member and said resilient means each to a respective said fixed portion of said parent structure for normally maintaining said resilient means highly stressed and holding said cutting means in said inoperative position against the action of said resilient means.

3. The combination of claim 2 wherein said cutting means comprises a loop of wire encircling said body retaining member, a portion of the perimeter of said loop defining a cutting edge.

4. In combination; an aircraft having two spaced apart relatively fixed portions, a first said portion being adjacent a first extremity of said aircraft and a second said portion being adjacent a second extremity of said aircraft; a body separable from said aircraft; a body retaining member mounted on said aircraft; means for maintaining said retaining member in tension to hold said body in fixed relationship to said aircraft; an elongated member having two ends, elongated resilient means having two ends, a first end of said resilient means being connected to a first end of said member, cutting means for cutting said retaining member, said cutting means being operatively associated with and acted upon by said resilient means and movable between an inoperative and a cutting position, said resilient means urging said cutting means to said cutting position, said inoperative position being such that said cutting means is out of cutting engagement with said retaining member and said cutting position being such that said cutting means is at least momentarily in cutting engagement with said retaining member, and means including fixing means securing the second end of said member to said first portion of said aircraft and the second end of said resilient means to said second portion of said aircraft for normally maintaining said resilient means highly stressed and holding said cutting means in said inoperative position against the action of said resilient means.

5. The combination of claim 4 wherein said cutting means comprises a loop of wire encircling said body retaining member, a portion of the perimeter of said loop defining a cutting edge.

References Cited in the file of this patent

UNITED STATES PATENTS

| | | |
|---|---|---|
| 1,604,141 | Amsler | Oct. 26, 1926 |
| 1,709,638 | Thwing | Apr. 16, 1929 |
| 2,693,108 | Eckhardt | Nov. 2, 1954 |